US005738717A

United States Patent [19]

Oulsnam et al.

[11] Patent Number: 5,738,717
[45] Date of Patent: Apr. 14, 1998

[54] COLORING PIGMENT AND METHOD OF MANUFACTURE

[75] Inventors: Bryon Thomas Oulsnam, Stoke-on-Trent, United Kingdom; Disederius Erasmus, Edelweiss Springs, South Africa

[73] Assignee: Corveagh Limited, Dublin, Ireland

[21] Appl. No.: 505,164

[22] PCT Filed: Feb. 11, 1994

[86] PCT No.: PCT/GB94/00288

§ 371 Date: Feb. 7, 1996

§ 102(e) Date: Feb. 7, 1996

[87] PCT Pub. No.: WO94/18276

PCT Pub. Date: Aug. 18, 1994

[30] Foreign Application Priority Data

Feb. 11, 1993 [GB] United Kingdom ............... 9302731
Jun. 8, 1993 [GB] United Kingdom ............... 9311837

[51] Int. Cl.$^6$ .................................................. C09C 1/24
[52] U.S. Cl. .................... 106/456; 106/457; 106/459; 423/138; 423/151; 423/152
[58] Field of Search .................................. 106/456, 457, 106/459; 423/138, 151, 152

[56] References Cited

U.S. PATENT DOCUMENTS

| | | | |
|---|---|---|---|
| 0,127,350 | 5/1872 | Hughes | 106/456 |
| 1,327,061 | 1/1920 | Penniman, Jr. et al. | |
| 1,848,660 | 3/1932 | Renkwitz | 106/456 |
| 4,123,501 | 10/1978 | Köhler et al. | 106/152 |
| 4,139,398 | 2/1979 | Pellizzon et al. | 106/456 |
| 4,299,635 | 11/1981 | Dickerson | 106/457 |
| 4,432,803 | 2/1984 | Hitzrot, Jr. | 106/456 |
| 4,966,641 | 10/1990 | Westerhaus et al. | 106/456 |
| 4,990,189 | 2/1991 | Weise et al. | 106/456 |

OTHER PUBLICATIONS

Levin et al. *Phase Diagrams for Ceramists* pp. 38 & 39 (1964).
*Encyclopedia of Chemical Technology*, vol. 17, pp. 795–798 (1982).

*Primary Examiner*—Mark L. Bell
*Assistant Examiner*—Louis M. Troilo
*Attorney, Agent, or Firm*—Loeb & Loeb LLP

[57] ABSTRACT

Coloring pigment of comparable quality to, and cheaper than, pigments products by chemical precipitation, is made from synthetic magnetite produced by oxidation of ferrous mill scale and reduced to a particle size such that preferably at least 85% of the product does not exceed 10 microns and 95% does not exceed 20 microns. The smaller the particle size the greater the tinting strength of the pigment. The pigment may be black or, by calcination of the synthetic magnetite, it may be red. For best quality the black pigment should contain 95–99.5% iron oxides, typically, and the magnetite should have a molecular ratio of 0.9 to 1.1:1. The shade and hue of red is dependent upon the calcination temperature and final size and shape of the particles. Reduction to the required particle size for the red coloring pigment may be done before and/or after calcination.

20 Claims, No Drawings

COLORING PIGMENT AND METHOD OF MANUFACTURE

This invention relates to colouring pigment, more particularly black or red colouring pigment, such as may be used in paints, rubber, concrete, plastics and various other materials and compositions, and a method of manufacturing such a colouring pigment.

High quality black colouring pigment is conventionally made by chemical precipitation of ferrous and ferric salts. The processes used, with some variations and improvements, are mostly based on the Penninman Zoph process as disclosed in U.S. Pat. No. 1327061. These are wet processes which require considerable expertise and control to produce a good quality pigment with a minimum of red, yellow and green contamination. From the black pigment produced, red pigments can be obtained by further processing.

Substantial capital investment in plant is involved and relatively high production costs so that the pigment produced by these conventional processes is expensive to buy.

A lower quality black colouring pigment is produced at lower cost by processing natural minerals, for example mined magnetite, carbon and other organic material, or inorganic materials such as bones. A poorer level of colouring, tinting strength and weathering ability is a characteristic of these pigments, resulting from the high content of undesirable elements in, and the unsuitable physical characteristics of, the minerals or materials used.

It is an aim of the present invention to provide a colouring pigment which is of better colour and tinting strength than this lower quality pigment and is not as costly to produce as the pigments obtained by chemical precipitation.

According to one aspect the present invention consists in colouring pigment made from a synthetic magnetite produced by oxidation of ferrous mill scale and reduced to a particle size such that preferably at least 95% of the product does not exceed 20 microns.

Typically at least 85% of the particle size of the product should not be more than 10 microns.

Ferrous mill scale for use in the production of the synthetic magnetite, being a waste product, is not costly. A ready source of ferrous mill scale is from the rolling of iron or steel billets but it may be obtained from other iron or steel plant sources as well.

Oxidised ferrous mill scale suitable for use in the manufacture of the pigment is commercially available.

A typical analysis of a synthetic magnetite made from ferrous mill scale and commercially available is:

| | |
|---|---|
| Total Iron as Fe | 71.27% |
| Iron Oxide as FeO | 5.30% |
| Magnetite as $Fe_3O_4$ | 87.40% |
| Hematite as $Fe_2O_3$ | 5.18% |
| $K_2O$ | 0.05% |
| Na | 0.05% |
| CaO | 0.49% |
| MgO | 0.11% |
| $SiO_2$ | 0.62% |
| $Al_2O_3$ | 0.28% |
| $Mn_3O_4$ | 0.39% |
| $Cr_2O_3$ | 0.08% |

The particle size of the colouring pigment affects the tinting strength of the colouring pigment, the smaller the particle size the greater the tinting strength. The higher the percentage of particles that does not exceed 10 microns the better the tinting strength that can be achieved. Ideally 100% of the pigment is reduced to a particle size not exceeding 10 microns.

The colouring pigment may be black. This is produced when temperatures in the manufacture of the pigment are kept low, preferably below 40° C. It is desirable that unoxidised iron should be kept to a maximum amount of 0.5% to avoid introducing a browning tint into the pigment which reduces the black quality of the pigment.

For the best quality black, apart from having a typical analysis of 95–99.5% oxides of iron, the molecular ratio of the synthetic magnetite should be 0.9 to 1.1:1, being defined as:

$$\text{Molecular ratio} = \frac{Fe^{3+}}{2Fe^{2+}} = 0.9 \text{ to } 1.1$$

A molecular ratio of this order ensures that there is little or no haemetite inclusion in the synthetic magnetite to reduce the denseness of the black colour achieved.

It is possible to achieve a black colouring pigment in accordance with the invention which has very little red, green or yellow contamination so that it provides an intense black with a distinctive blue background, and with a tinting strength comparable to that produced by pigment made by the known chemical precipitation processes.

The colouring pigment may alternatively be red. This is obtained by subjecting the synthetic magnetite to calcination.

It should be understood that the term "red" as used herein is intended to cover all shades and hues of this colour including a bright vivid red, an orange or brown shade of red, a deep red, maroon and purple and is not restricted to the colours associated with light in the wavelength 740–620 nanometers.

For the red colouring pigment the synthetic magnetite may be reduced from the raw material to the required particle size of the pigment. Alternatively or additionally the particle size may be reduced, or reduced further, when the desired shade of red of the pigment has been achieved. As in the black colouring pigment, the particle size affects the tinting strength of the red colouring pigment, the smaller the particle size the greater the tinting strength.

The shade and hue of red achieved in the colouring pigment is a function of the calcination condition and of the final size and shape of the particles of the pigment. A particular shade and hue of red may be achieved by calcination and may be modified as desired by reduction of the particle size. Darker shades are produced from larger particle sizes within the preferred range.

In the presence of oxygen the colour of the synthetic magnetite when heated above 40° C. turns from black progressively through brown to orange, red, to a darker hue of red and then to maroon. Typically, at a temperature in the region of 300° C. to 600° C. the colour changes from brown through orange to a light red, from about 600° C. to 700° C. the colour of the red deepens to a darker, brighter red, and from about 700° C. to 800° C. the red colour deepens further and becomes maroon. If the synthetic magnetite is heated above this temperature the maroon turns progressively to a deep purple as the colour moves into the purple colour spectrum.

The aforesaid molecular ratio of the synthetic magnetite for best quality black colouring pigment is also the preferred molecular ratio for the red colouring pigment in accordance with the first aspect of the present invention.

According to a second aspect of the present invention there is provided a method of manufacturing a colouring pigment in which ferrous mill scale is oxidised to produce synthetic magnetite and the pigment is reduced to a particle size such that at least 95% of the pigment does not exceed 20 microns.

As stated in respect of the colouring pigment in accordance with the first aspect of the invention herein set forth, typically at least 85% of the particle size of the product should not be more than 10 microns and ideally 100% of the pigment is reduced to a particle size not exceeding 10 microns.

The required particle size may be obtained by milling, preferably by dry milling, as, for example, in an air jet or ball type mill. Particle size may be checked by a laser analyser and controlled during reduction by air classifiers or retention time within the mill.

Reduction to the required particle size may possibly be done by a wet milling process, which may entail subsequent drying of the particles.

For a black colouring pigment there is no heating, or preferaby no heating above 40° C., of the synthetic magnetite. If the temperature is maintained below 40° C. a very good blue black colour is achieved. Above that temperature the quality of the black colour reduces.

A red colouring pigment may be obtained by the method. This pigment is produced by calcination of the synthetic magnetite by heating the synthetic magnetite above 40° C. in the presence of oxygen.

Preferably the synthetic magnetite is heated in a rotary kiln but a fluid bed roaster, flash calcination or another known method of heating the synthetic magnetite to produce the required shade and hue of red colouring pigment could be employed instead. Any known fuel may be used for the heating, and the heating may be direct or indirect depending upon contaminants that may be present in the fuel and their desirability in the finished pigment.

Once the synthetic magnetite has reached the required temperature to give the desired shade and hue the temperature may be reduced rapidly to prevent further change in the colour. Preferably the cooling is achieved by blowing cold air over or through the pigment.

The aforesaid molecular ratio of the synthetic magnetite preferred for the manufacture of the red colouring pigment ensures good tinting strength of the shades and hues of red that are achieved in the pigment.

The red colouring pigment may be produced from the direct calcination and oxidation of the ferrous mill scale by continuing oxidation after a molecular ratio of 1:1 of the synthetic magnetite has been achieved until the magnetite is converted to haemetite. In the manufacture of the red colouring pigment, therefore, the mill scale is converted to synthetic magnetite and then to synthetic haemetite.

Reduction of the pigment to the required particle size may be carried out at any stage in the method, or indeed at more than one stage in the method. Conveniently, the required particle size is achieved by reducing the particle size of the synthetic magnetite used as a raw material. Alternatively or additionally the particle size of the red colouring pigment produced once the desired shade and hue of red has been achieved may be reduced further to increase the tinting strength of the pigment.

The preferred methods of manufacture enable good quality pigments to be produced at competitive prices, as compared with pigments made by the known manufacturing processes described, and without undesirable effluent.

Table I and Table II below set out respectively an analysis of a typical example of a black colouring pigment and a red colouring pigment in accordance with the present invention.

TABLE I

| Black Colouring Pigment | |
| --- | --- |
| Particle size | 0.1 to 0.5 μm |
| Fe$_3$O$_4$ content | 95 to 99.5% m/m |
| Crystal configuration | cubic/random |
| Moisture content | <1% m/m |
| Carbon content | nil |
| PH | 7–5 |
| SG | 4–5.5 g/cm$^3$ |
| Oil absorption | 10–12 |
| Surface area | 5–10 m$^2$/g |
| Soluble salts | <0.08% m/m |

TABLE II

| Red Colouring Pigment | |
| --- | --- |
| Particle Size | 0.1 to 0.5 μm |
| Fe$_2$O$_3$ content | 95 to 99.5% m/m |
| Crystal configuration | spheroidal/rhombohedral/random |
| Moisture content | <1% m/m |
| Carbon content | nil |
| pH | 7–5 |
| SG | 4–5.5 g/cm$^3$ |
| Oil absorption | 15–25 |
| Surface area | 5–10 m$^2$/g |
| Soluble salts | <0.08% m/m |

The molecular ratio of the synthetic magnetite in each example is within the preferred band. In both examples the particle size was obtained by dry milling and checked by a laser analyser with control of the size during reduction by air classifiers. For the black colouring pigment temperatures were kept below 40° C. during manufacture to produce a high quality blue black colour. For the red colouring pigment the various shades referred to above were obtained by calcination at temperatures in the range 150° C.–800° C. in a rotary kiln followed by rapid cooling by blown cold air.

Results from Malvern particle size analysis tests on five typical samples of colouring pigment in accordance with the present invention are given in Table III below.

TABLE III

| Particle | PERCENT UNDER HIGH SIZE | | | | |
| --- | --- | --- | --- | --- | --- |
| High Size Micron | Sample 101/4 v | Sample 101/2 v | Sample 101/4 LS | Sample 13.320 | Sample 101/4 LS |
| 24.9 | 98.6 | 98.8 | 98.9 | 99.7 | 99.5 |
| 16.3 | 95.1 | 95.8 | 92.9 | 96.3 | 95.1 |
| 10.7 | 87.5 | 87.4 | 84.7 | 90.9 | 87.9 |
| 6.97 | 74.7 | 70.3 | 79.1 | 86.7 | 82.5 |
| 5.07 | 60.6 | 52.1 | 73.5 | 84.0 | 77.1 |
| 1.95 | 18.2 | 12.4 | 25.8 | 53.6 | 29.4 |
| 0.93 | 8.9 | 5.1 | 4.4 | 7.9 | 4.1 |
| 0.83 | 8.0 | 4.5 | 3.1 | 4.9 | 2.5 |
| 0.61 | 5.6 | 2.8 | 1.1 | 1.0 | 0.6 |

What is claimed is:

1. A coloring pigment made from a synthetic magnetite produced by oxidation of ferrous mill scale and reduced to a particle size such that at least 95% of the synthetic magnetite does not exceed 20 microns to give a black or red pigment in which the unoxidized iron content is no more than 0.5%, and in which the analysis of the synthetic magnetite is:

| | |
|---|---|
| Total Iron as Fe | 71.27% |
| Iron Oxide as FeO | 5.30% |
| Magnetite as $Fe_3O_4$ | 87.40% |
| Hematite as $Fe_2O_3$ | 5.18% |
| $K_2O$ | 0.05% |
| Na | 0.05% |
| CaO | 0.49% |
| MgO | 0.11% |
| $SiO_2$ | 0.62% |
| $Al_2O_3$ | 0.28% |
| $Mn_3O_4$ | 0.39% |
| $Cr_2O_3$ | 0.08%. |

2. The coloring pigment according to claim 1 in which the magnetite has a $Fe^{3+}/2Fe^{2+}$ molecular ratio of 0.9 to 1.1.

3. The coloring pigment according to claim 1 in which at least 85% of the synthetic magnetite is reduced to a particle size not exceeding 10 microns.

4. The coloring pigment according to claim 1 which is red, the synthetic magnetite having been subjected to calcination.

5. The coloring pigment according to claim 4 in which the synthetic magnetite has been converted by oxidation to hematite.

6. A method of manufacturing a coloring pigment in which ferrous mill scale is oxidized, in an oxidation step, to produce synthetic magnetite and the synthetic magnetite is reduced, in a reduction step, to a particle size such that at least 95% of the synthetic magnetite does not exceed 20 microns, the oxidation step being a dry process.

7. The method according to claim 6 in which at least 85% of the synthetic magnetite is reduced to a particle size not exceeding 10 microns.

8. The method according to claim 6 in which the synthetic magnetite is reduced to the required particle size by dry milling.

9. The method according to claim 6 in which the synthetic magnetite is reduced to the required particle size by wet milling and is then dried.

10. The method according to claim 6 in which the synthetic magnetite is kept at a temperature below 40° C. during the particle size reduction and the resultant coloring pigment produced is black.

11. The method according to claim 6 in which the synthetic magnetite is subjected to calcination and the resultant coloring pigment produced is red.

12. The method according to claim 11 in which the synthetic magnetite is converted by oxidation to hematite.

13. The method according to claim 11 in which the synthetic magnetite is heated to a temperature in the range of 300° C. to 800° C. and then rapidly cooled.

14. The method according to claim 13 in which the heated synthetic magnetite is rapidly cooled by blowing cold air over or through the synthetic magnetite.

15. The method according to claim 11 in which the synthetic magnetite is reduced in one stage to the required particle size.

16. The method according to claim 11 in which the synthetic magnetite is reduced in more than one stage to the required particle size.

17. The method according to claim 16 in which the particle size of the synthetic magnetite is reduced initially when the synthetic magnetite is in its raw state and is reduced further to the required final size after calcination.

18. The method according to claim 11 in which the calcination is achieved by heating the synthetic magnetite in a rotary kiln.

19. The method according to claim 7 in which the synthetic magnetite is reduced to the required particle size by dry milling.

20. The method according to claim 7 in which the synthetic magnetite is reduced to the required particle size by wet milling and is then dried.

* * * * *